United States Patent [19]

Williams

[11] 4,191,273

[45] Mar. 4, 1980

[54] SEAL AND SOUND ATTENUATOR FOR CONTROL CONSOLE

[75] Inventor: Hugh K. Williams, Milwaukee, Wis.

[73] Assignee: Allis-Chalmers Corporation, Milwaukee, Wis.

[21] Appl. No.: 912,846

[22] Filed: Jun. 5, 1978

[51] Int. Cl.[2] ........................................... G10K 11/00
[52] U.S. Cl. .............................. 180/89.13; 296/39 A; 181/200; 181/294
[58] Field of Search ................................ 181/200–209, 181/294, 296, 284; 180/69 R, 89.12, 89.13, 89.14, 89.16, 89.17, 89.19; 264/50, 51, 53, 54; 249/38, 40; 296/39 A

[56] References Cited

U.S. PATENT DOCUMENTS

| | | | |
|---|---|---|---|
| 3,774,710 | 11/1973 | Gustavsson | 181/204 |
| 3,918,530 | 11/1975 | Nyholm | 181/207 |
| 3,918,541 | 11/1975 | Krieger | 181/207 |
| 3,990,535 | 11/1976 | Bruce | 181/207 |

*Primary Examiner*—L. T. Hix
*Assistant Examiner*—Benjamin R. Fuller
*Attorney, Agent, or Firm*—Arthur L. Nelson

[57] ABSTRACT

A foam seal and insulator for sealing a compartment in the control console and attenuating sound in the compartment which contains a plurality of actuating levers for controlling the operation of the vehicle with actuating cables extending through the insulator to control the operation of the vehicle.

10 Claims, 4 Drawing Figures

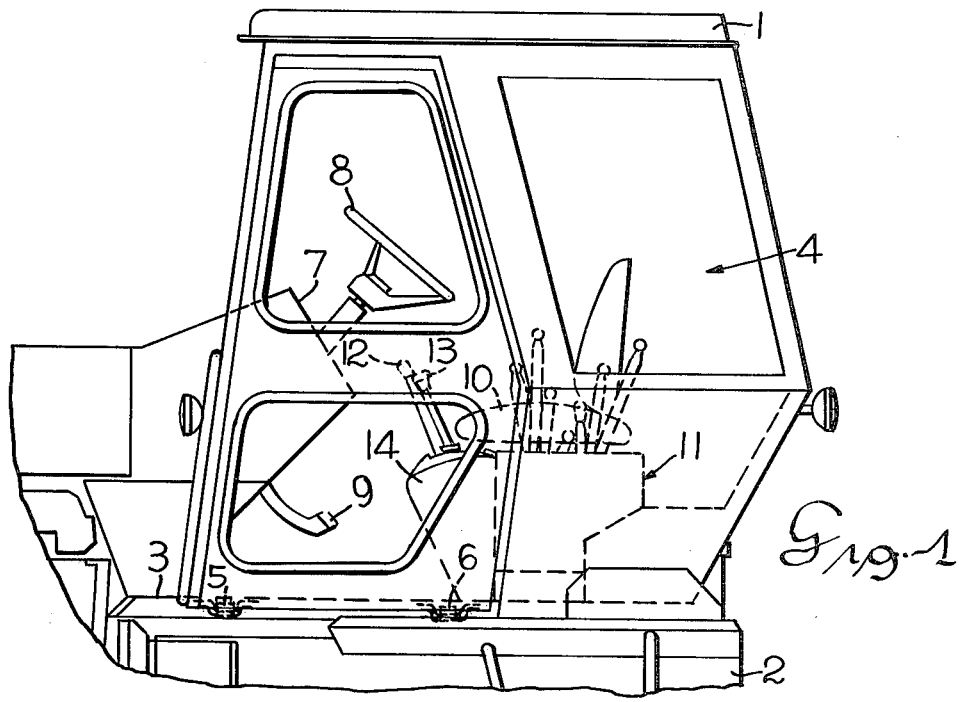
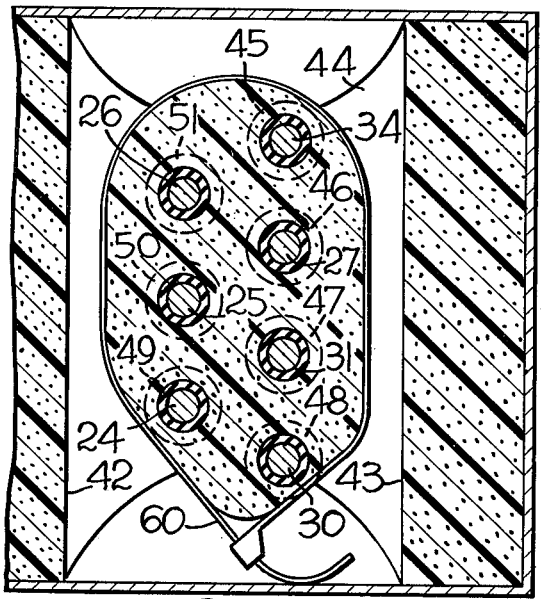
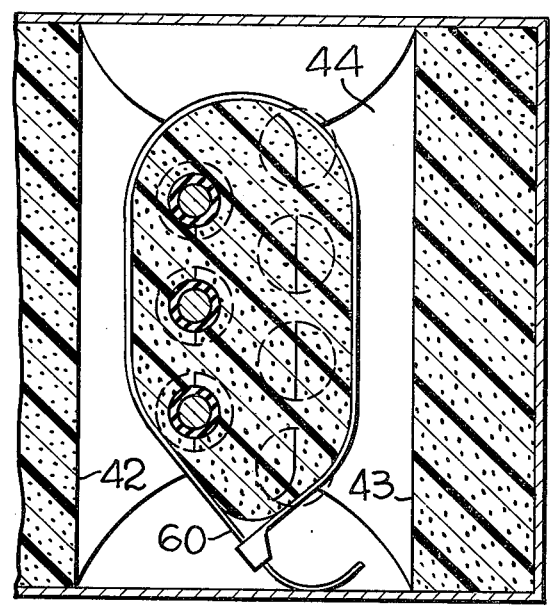

SEAL AND SOUND ATTENUATOR FOR CONTROL CONSOLE

This invention relates to a seal and sound attenuating means and more particularly to a control console having control levers for controlling the vehicle with force transmitting means extending through the sealing and sound attenuating medium for operating servomechanisms.

The modern tractor and particularly the larger tractors with greater horsepower tend to raise the noise level at the operator station. In these tractors having cabs in which the sound level is increased special efforts are required to reduce noise levels such as isolating the cab from the vehicle chassis. Resilient supports are positioned between the cab and the chassis to reduce sound transmission through the supporting structure and also to isolate the engine compartment from the cab. It is important to eliminate openings between the engine and the transmission areas, and particularly the dash board and the platform. One of the problems arise in the area of the various controls in which movement is required at the operator station to operate a servomechanism or valve on the vehicle chassis. Controlling movement may be in the form of a force transmitting member for mechanical or hydraulic operation. Where the movement is mechanical, it is necessary that the openings for receiving the force transmitting members be sealed because a direct opening between the engine compartment or the transmission housings greatly amplify the sound level in the operator station. Accordingly, this invention provides a means whereby the control console at the operator station is provided with a means for sealing of the platform on which a control console is mounted. The sealing and sound attenuating material is deformable to close openings and seal the underside of the compartment in the control console and thereby attenuate sound transmitted from the underside of the platform.

Accordingly, it is an object of this invention to provide a sound attenuating medium in the control console of a motor vehicle.

It is another object of this invention to provide a deformable foam having openings for receiving sheathed cables with means for pressing the foam material around the cables to seal the partition on the lower side of the control console for attenuation of sound transmitted toward the operator station.

It is a further object of this invention to provide a block of urethane foam with an adhesive for bonding the block to the base of the control console. The block is provided with a plurality of openings which extend from the compartment within the control console to the underside of the platform which receive sheathed cables connected from control levers in the control console to operate servomechanisms. The chassis tie wrap is wrapped around the foam block to deform the foam and press firmly around the sheaths of the control cables to form a positive seal and sound attenuation from the underside of the platform to the control console.

The objects of this invention are accomplished by providing a seal and sound attenuating medium in the control console of a vehicle. The control console is mounted at the operator station and mounted on the platform of the cab. A block of urethane foam is bonded to the platform at the bottom of the control console to provide sound attenuation. A plurality of openings extend through the urethane foam block and receive sheathed cables which are operated by levers in the control console. The sheathed cables extend through the block to the underside of the platform for controlling mechanisms of the vehicle. The block of urethane foam can be deformed by tightening of a tie wrap to deform the foam to form a seal around each of the cables extending through the urethane foam. The deformation of the foam provides a positive seal by closing all openings between the compartment in the control console and the underside of the platform. Sound is attenuated by closing of the openings and by the sound attenuating nature of the urethane foam bonded to the platform in the control console compartment. A plurality of holes is provided in the block in which any number of the holes can be used by extensions of cables therein and the tie wrap will close any openings which do not receive a cable as well as firmly seal the sheath of any sheathed cables extending through an opening to thereby seal off any sound paths from the underside of the platform to the compartment in the control console.

Referring to the drawings, the preferred embodiment of this invention is illustrated:

FIG. 1 illustrates a side elevation view of a cab on a tractor showing the operator station defined by the steering wheel, the control levers, the seat and the control console in the cab.

FIG. 2 is a cross section view taken on line II—II of FIG. 4.

FIG. 3 is a cross section view taken on the same plane as FIG. 2 with the use of three openings for receiving force transmitting cables while the other four openings are sealed shut by the tie wrap around the urethane foam.

Figure 4:
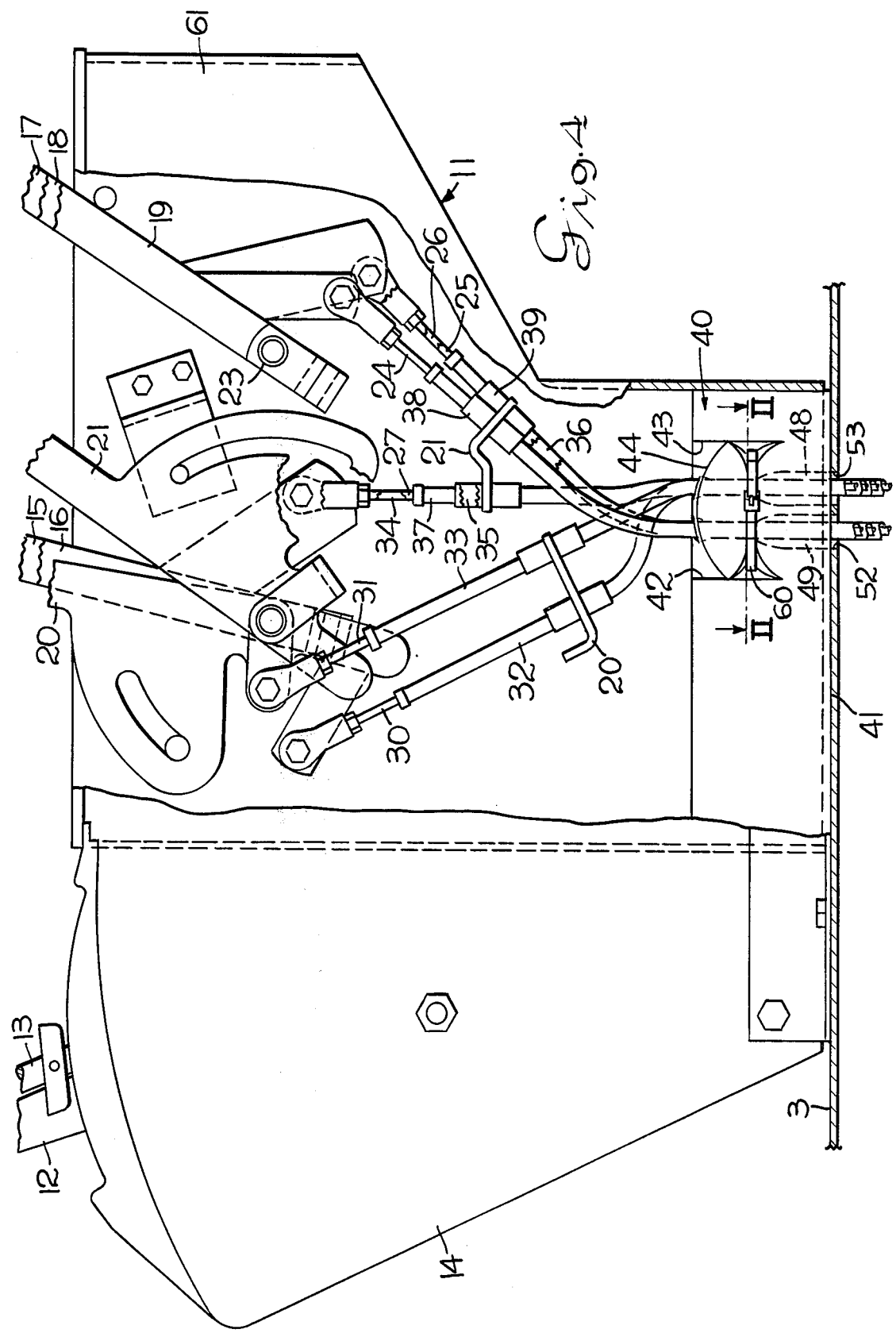
FIG. 4 is a partially sectioned side elevation view showing the control console and the control levers and force transmitting cables connected to the control levers and extending through the urethane block to operate servomechanisms and valves in the tractor for controlling the operation of the tractor.

Referring to the drawings, FIG. 1 illustrates a portion of a side elevation view of a tractor. The cab 1 defines the operator station 4. The platform 3 carrying the cab 1 is resiliently mounted on the chassis 2 through the isolators 5 and 6. The dash board 7 supports the steering column for the steering wheel 8 and the brake pedal 9. The seat 10 is mounted on a support carried on the platform 3. Likewise, the control console 11 is supported on the platform 3. The range shift transmission lever 12 is pivotally supported in the forward section 14 of the control console 11. The shift lever 13 for the main transmission is also pivotally supported in the forward portion 14 of the control console.

FIG. 4 shows an enlarged view of the control console 11. A section of the control console is broken away to show the remote cylinder control levers 15, 16, 17 and 18. The power take-off clutch lever 19 is also shown pivotally mounted in the control console 11. The hydraulic weight distribution system is also controlled by the position control lever 20 and the draft load control lever 21 which are pivotally supported in the control console 11.

The pivotally supported levers operate mechanisms or control valves in the tractor or implement through a sheathed cable. The sheaths of the cable are supported on the cross members 20 and 21 which are supported on the sidewalls of the control console 11. The levers 17, 18 and 19 are pivotally supported on the pin 23 supported in the control console 11. The sheaths of the cables 24, 25 and 26 are supported in the cross member 21. The sheaths of the cables 27 and 28 are also supported in the cross member 21 as indicated. Similarly, the sheaths of the cables 30 and 31 are mounted in the cross member 20. The cables 30 and 31 reciprocate within the sheaths 32 and 33, respectively. Similarly, the cable 34 reciprocates within the sheath 35. Cables 24 and 25 reciprocate within the sheaths 38 and 39. Accordingly, the sheaths on the cables are fixed relative to the control console 11 and as the cables extend through the insulation block 40 and the sheaths of the cables are fixed in the insulation block 40. The insulation block 40 adheres to the platform 3 through a bonding agent 41 on the undersurface of the insulation block 40. The insulation block 40 provides for insulation within the bottom of the control console 11. The block is cut transversely in the upper portion to form the walls 42 and 43 as well as the deformed center portion 44. The deformed portion 44 is formed with a plurality of openings 45, 46, 47, 48, 49, 50 and 51. These openings extend vertically through the deformable portion and are aligned with holes in the platform 3 of which the holes 52 and 53 are shown aligned with the holes 49 and 48. The sheathed cables 38, 39 and 36 extend through the openings 49, 50 and 51, respectively. Similarly, the sheathed cables 33, 32, 35 and 37 extend through the openings 48, 47, 46 and 45. FIG. 2 shows this arrangement of sheathed cables openings. The deformed portion 44 of block 40 is shown with the tie wrap 60 tightened around the intermediate part of the deformed portion. It is noted that the cables are sealed in the mass of the deformed block and all openings are closed off between the underside of the platform and the compartment 61 in the control console. The block also operates as a sound attenuating mass which attenuates sound transmission from the underside of the platform 3 to the compartment 61 of the control console 11. For the purpose of illustration, one tie wrap 60 is shown. More then one time tie wrap or a wider tie wrap may be used to provide a longer contact surface between the urethane block and the cable sheaths.

FIG. 3 illustrates the situation where only 3 sheathed cables are positioned in openings in the deformed block 44. By tightening of the tie wrap 60, all the holes are sealed off and those holes which receive the sheathed cables are also sealed by deforming the deformable mass to press against the periphery of all of the cables. It is noted that regardless of the number of cables received in respective openings, the mass of sound attenuating material always closes the openings and seals the openings whether there is a cable received or not.

The operation of the device will be described in the following paragraphs.

A plurality of levers mounted in the control console 11 are pivotally supported for operation by the operator at the operator station. Pivotal movement of the levers operate a respective cable connected to the lever which extends downwardly through the urethane block 40. The urethane block 40 is bonded to the upper surface of the platform 3 by an adhesive 41 on the interface between the sound attenuating block 40 and the platform. The attenuating block 40 extends transversely to fill the bottom of the chamber 61 in the control console 11. The deformed portion 44 is provided by forming two slits across the block which extend downward sufficiently to allow deforming of the intermediate portion 44 of the sound attenuating block 40. The cables from the levers are inserted in the holes in the block and extend through the platform to operate servomechanisms, valves, etc. Each cable reciporcates within a sheath which remain stationary since they are mounted on the cross members 20 and 21 and the sheath is fixed relative to the control console 11. With the cable sheaths fixed in the deformed portion 44 of the sound attenuating block 40, the tie wrap 60 is pulled tightly to constrict the deformed mass 44 causing a seal around the periphery of all of the cables.

In the case of the modification shown in FIG. 3, any openings not receiving a cable are also closed by the constriction of the tie wrap 60. Accordingly, all openings are closed to prevent any sound transmission through openings from the underside of the platform to the chamber 61 in the control console. Regardless of the number of cables used, the operation is basically the same. By closing the openings and providing a sound attenuating material such as urethane foam, the tight seal is provided to prevent any movement of air to and from the chamber 61 of the control console and also the sound attenuating characteristics of the block 40 drastically reducing sound transmission from the underside of the platform. Accordingly, the block 40 provides a seal and a sound attenuating means in the control console.

The embodiments of the invention in which an exclusive property or privilege is claimed are defined as follows:

1. A sound attenuating device on a vehicle comprising, a vehicle chassis, a platform mounted on said chassis defining an operator station, a control console mounted on said platform defining an interior compartment, at least one lever mounted in the compartment of said control console for operating a control function of the vehicle, a partition delineating the compartment of said control console forming an exterior wall, deformable sound attenuating material mounted on said partition covering the exterior wall and defining a plurality of holes, a force transmitting member connected to said lever and extending through one of said holes in said sound attenuating material and said partition, a casing enclosing said force transmitting member mounted in one of said holes and stationary relative to said sound attenuating material, a deforming member pressing the sound attenuating material against the casing enclosing the force transmitting member and closing the holes to provide sealing and sound attenuation of said compartment from the external side of said partition.

2. A sound attenuating device on a vehicle as set forth in claim 1 including a bonding agent at the intersurface between said sound attenuating material and said partition.

3. A sound attenuating device on a vehicle as set forth in claim 1 wherein said force transmitting member and casing includes a sheathed cable mounted in a static position in the sound attenuating material, a cable connected to said lever for transmitting force through said sound attenuating material and said partition for operating as a force transmitting means.

4. A sound attenuating device on a vehicle as set forth in claim 1 wherein said force transmitting member and casing includes a sheathed cable, at least one opening without a cable, said deforming member presses the sound attenuating material against said sheath of said sheathed cable and closing said opening not receiving a cable.

5. A sound attenuating device on a vehicle as set forth in claim 1 wherein said sound attenuating material includes urethane foam.

6. A sound attenuating device on a vehicle as set forth in claim 1 wherein said sound attenuating material includes a urethane foam block, an adhesive on the surface of said sound attenuating block forming a bonding interface between said block and said partition.

7. A sound attenuating device on a vehicle as set forth in claim 1 wherein said deforming member includes a tie wrap which constricts the periphery of said sound attenuating material.

8. A sound attenuating device on a vehicle as set forth in claim 1 wherein said sound attenuating material includes a urethane foam block, a center portion of said urethane block partially severed from the end portions of said block, said deforming member defining a tie wrap around the center portion of said block to constrict and deform the urethane foam.

9. A sound attenuating device on a vehicle as set forth in claim 1 including a plurality of levers.

10. A sound attenuating device on a vehicle as set forth in claim 1 including a plurality of levers, a plurality of force transmitting members and casings defining sheathed cables, said attenuating material defiens a urethane foam block, said partition defines the platform of a vehicle, and adhesive on said urethane block forming an interface between said lock and said platform, said deforming member defining a tie for wrapping around the urethane block to deform the urethane block to form a positive seal closing the openings in the said urethane block and sealing the periphery of the sheath of said sheathed cables.

* * * * *